US006529931B1

(12) United States Patent
Besz et al.

(10) Patent No.: US 6,529,931 B1
(45) Date of Patent: Mar. 4, 2003

(54) PREFIX TREE ADDER WITH EFFICIENT CARRY GENERATION

(75) Inventors: Matthew Besz, Kempton, PA (US); Alexander Goldovsky, Philadelphia, PA (US); Ravi Kumar Kolagotla, San Diego, CA (US); Christopher John Nicol, Springwood N.S.W. (AU)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/291,677

(22) Filed: Apr. 14, 1999

(51) Int. Cl.$^7$ ................................................. G06F 7/50
(52) U.S. Cl. ...................................... 708/711; 708/710
(58) Field of Search .................................. 708/710–711

(56) References Cited

U.S. PATENT DOCUMENTS

| | | | | | |
|---|---|---|---|---|---|
| 5,477,480 A | * | 12/1995 | Inui | ........................... | 708/711 |
| 5,701,504 A | * | 12/1997 | Timko | ......................... | 708/710 |
| 5,881,274 A | * | 3/1999 | Ngo et al. | ................... | 708/710 |

OTHER PUBLICATIONS

A. Weinberger and J.L. Smith, "A One–Microsecond Adder Using One–Megacycle Circuitry," IRE Trans. on Electronic Computers, pp. 65–73, Jun. 1956.
T.–F. Ngai et al., "Regular, Area–Time Efficient Carry–Lookahead Adders," Journal of Parallel and Distributed Computing, vol. 3, pp. 92–105, 1986.
P.M. Kogge and H.S. Stone, "A Parallel Algorithm for the Efficient Solution of a General Class of Recurrence Equations," IEEE Trans. on Computers, vol. C–22, No. 8, pp. 786–793, Aug. 1973.
R.P. Brent and H.T. Kung, "A Regular Layout for Parallel Adders," IEEE Trans. on Computers, vol. C–31, No. 3, pp. 260–264, Mar. 1982.
D. Dozza et al., "A 3.5 NS, 64 Bit, Carry–Lookahead Adder," in Proc. Intl. Symp. Circuits and Systems, pp. 297–300, 1996.
J. Silberman et al., "A 1.0 GHz Single–Issue 64b PowerPC Integer Processor," IEEE Intl. Solid–State Circuits Conf., pp. 230–231, Feb. 1998.
W. Liu et al., "A 250–MHz Wave Pipelined Adder in 2–$\mu$m CMOS," IEEE Journal of Solid–State Circuits, vol. 29, No. 9, pp. 1117–1128, Sep. 1994.
A. Beaumont–Smith et al., "A GaAs 32–bit Adder," IEEE Symposium Computer Arithmetic, pp. 10–17, Jul. 1997.
Z. Wang et al., "Fast Adders Using Enhanced Multiple–Output Domino Logic," IEEE Journal of Solid–State Circuits, vol. 32, No. 2, pp. 206–214, Feb. 1997.
G. Bewick et al., "Approaching a Nanosecond: A 32 Bit Adder," IEEE International Conference on Computer Design: VLSI in Computers & Processors, pp. 221–226, Oct. 1988.
A. Weinberger, "High–Speed Binary Adder," IBM Technical Disclosure Bulletin, vol. 24, No. 8, pp. 4393–4398, Jan. 1982.

* cited by examiner

Primary Examiner—Tan V. Mai
(74) Attorney, Agent, or Firm—Ryan, Mason & Lewis, LLP (57) ABSTRACT

An n-bit prefix tree adder includes n prefix trees, each associated with a bit position of the adder and including a number of computation stages. In accordance with an illustrative embodiment of the invention, the prefix trees are interconnected such that carry signals are computed at least partially in parallel. For example, a carry signal computed in an initial stage of a given prefix tree is used in subsequent stages of the given prefix tree without introducing substantial additional delay in computation of other carry signals in other prefix trees associated with higher bit positions. Carries computed for lower bit positions are thus used to compute carries for higher bit positions, but generate, propagate and/or transmit signals may be generated in an initial stage of each of the prefix trees without utilizing a primary carry input signal in the computation. The resulting adder architecture provides reduced logic depth, delay and circuit area relative to conventional architectures.

25 Claims, 5 Drawing Sheets

PREFIX TREE ADDER WITH EFFICIENT CARRY GENERATION

FIELD OF THE INVENTION

The present invention relates generally to electronic circuits and more particularly to adder circuits for use in semiconductor integrated circuits and other electronic devices.

BACKGROUND OF THE INVENTION

As a result of ever-shrinking very large scale integration (VLSI) process geometries, it has become necessary to reexamine the tradeoffs that have been made in the existing design and implementation of computer arithmetic algorithms. Algorithms utilizing the so-called carry lookahead technique, as described in A. Weinberger and J. L. Smith, "A One-Microsecond Adder Using One-Megacycle Circuitry," IRE Trans. on Electronic Computers, pp. 65–73, June 1956, speed up the addition process by unrolling a recursive carry equation. Both transistor count and interconnection complexity have typically limited the maximum unrolling to 4 bits. Larger adders have been built as block carry-lookahead adders, where the lookahead operation occurs within small blocks, as described in T.-F. Ngai et al., "Regular, Area-Time Efficient Carry-Lookahead Adders," Journal of Parallel and Distributed Computing, Vol. 3, pp. 92–105, 1986.

The recursive carry computation can also be reduced to a prefix computation, as described in, e.g., P. M. Kogge and H. S. Stone, "A Parallel Algorithm for the Efficient Solution of a General Class of Recurrence Equations," IEEE Trans. on Computers, Vol. C-22, No. 8, pp. 786–793, August 1973. As described in R. P. Brent and H. T. Kung, "A Regular Layout for Parallel Adders," IEEE Trans. on Computers, Vol. C-31, No. 3, pp. 260–264, March 1982, a prefix tree can be used to compute the carry at the most-significant bit position, and an additional tree superimposed on the prefix tree can be used to compute the intermediate carries. Faster computation of all the carries can be achieved by using a separate prefix tree for each bit position, as described in D. Dozza et al., "A 3.5 NS, 64 Bit, Carry-Lookahead Adder," in Proc. Intl. Symp. Circuits and Systems, pp. 297–300, 1996.

A problem associated with the above-noted full prefix tree adders, which are also known as Kogge-Stone adders, is the additional delay introduced as a result of exponentially growing interconnection complexity. Existing architecture tradeoffs have emphasized reduction of interconnection complexity at the expense of higher gate fanouts. Interconnection complexity can also be reduced by using hybrid carry lookahead/carry select architectures which eliminate the need to implement a full prefix tree for each bit position. The use of low resistance and low capacitance materials can reduce the negative effects of architectures that depend on large amounts of interconnect, as described in J. Silberman et al., "A 1.0 GHz Single-Issue 64b PowerPC Integer Processor," IEEE Intl. Solid-State Circuits Conf., pp. 230–231, February 1998. Furthermore, with additional levels of interconnect, the area overhead required to implement such adders is alleviated through the use of extensive "over-the-cell" routing, which removes the routing channels and further minimizes the interconnect capacitance.

The operation of conventional prefix tree adders will be described in greater detail with reference to FIGS. 1 and 2. In a general n-bit prefix tree adder, the addition of two numbers A and B, $$A = -a_{n-1}2^{n-1} + \sum_{j=0}^{n-2} a_j 2^j$$

$$B = -b_{n-1}2^{n-1} + \sum_{j=0}^{n-2} b_j 2^j,$$

represented in two's complement binary form, can be accomplished by computing:

$$\left.\begin{array}{l} g_j = a_j b_j \\ p_j = a_j \oplus b_j \\ c_j = g_j + p_j c_{j-1} \\ s_j = p_j \oplus c_{j-1} \end{array}\right\} \forall j, 0 \le j < n,$$

where $c_{-1}$ is the primary carry-input. The signals designated $g_j$, $p_j$ and $c_j$ are referred to herein as generate, propagate and carry signals, respectively; The resulting sum of A and B is $$S = -s_{n-1}2^{n-1} + \sum_{j=0}^{n-2} s_j 2^j.$$

An overflow occurs, and the resulting sum is invalid, if $$c_{n-1} \oplus c_{n-2} = 1.$$

The above-cited Dozza et al. reference defines $(G_j^j, P_j^j) = (g_j, p_j)$, and $$(G_i^j, P_i^j) = (g_j, p_j) o (g_{j-1}, p_{j-1}) o \ldots o(g_i, p_i) \text{ if } j > i,$$

where o is the fundamental carry operator described in the above-cited Brent and Kung reference and defined as $$(g_j, p_j) o (g_i, p_i) = ((g_j + p_j g_i), p_j p_i)$$

The fundamental carry operator o is both associative and idempotent. At each bit position, the carry is given by $$c_j = G_0^j + P_0^j c_{-1} \qquad (1)$$

where $c_{-1}$ is the primary carry input. If there is no primary carry input, then $c_j$ is simply $G_0^j$.

Figure 1:
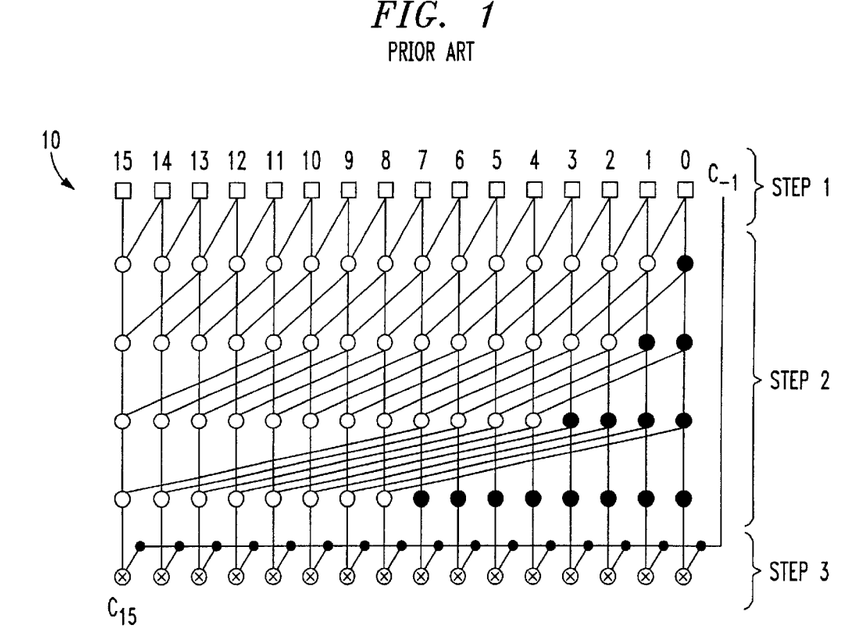
FIGS. 1 and 2 show sets of prefix trees for conventional 16-bit prefix tree adders.

FIG. 1 shows a set of superimposed prefix trees 10 for a prefix tree adder in which the computation of $(G_0^j, P_0^j) \forall j$ can be accomplished in $\lceil \log_2 n \rceil$ stages. In the set of prefix trees 10, n=16. A complete n-bit prefix tree adder with a set of prefix trees of the type shown in FIG. 1 can be constructed by implementing the following steps.

Step 1 (1 stage):
Calculate $g_j = a_j b_j$ and $p_j = a_j \oplus b_j \forall j \; 0 \le j < n$.
Step 2 ($\lceil \log_2 n \rceil$ stages):
For k=1 ... $\lceil \log_2 n \rceil$ calculate $$(G_0^j, P_0^j) = (G_{j-2^{k-1}+1}^j, P_{j-2^{k-1}+1}^j) o (G_0^{j-2^{k-1}}, P_0^{j-2^{k-1}}) \forall j \; 2^{k-1} \le j < 2^k - 1$$

$$(G_{j-2^k+1}^j, P_{j-2^k+1}^j) = (G_{j-2^{k-1}+1}^j, P_{j-2^{k-1}+1}^j) o (G_{j-2^k+1}^{j-2^{k-1}}, P_{j-2^k+1}^{j-2^{k-1}}) \forall j \; 2^k - 1 \le j < n.$$

Step 3 (1 stage)
Calculate $c_j = G_0^j + P_0^j c_{-1} \forall j \; 0 \le j < n$.
Step 4 (1 stage)
Calculate $s_j = p_j \oplus c_{j-1} \forall j \; 0 \le j < n$.
In the set of prefix trees 10 of FIG. 1, the open squares at the top compute propagate signals $p_j$ and generate signals $g_j$ for each bit position in accordance with Step 1, the empty circles apply the fundamental carry operator in accordance with Step 2, and the filled circles represent buffers. The last stage, shown as crossed circles in FIG. 1, applies equation (1) to every $(G_0^j, P_0^j)$ in accordance with Step 3. The output of this stage is the carry at each bit position. An additional sum generation stage (not shown) is needed to generate the sum at each bit position from the $p_j$ signal and the carry from the previous bit position in accordance with Step 4. A complete 16-bit adder includes the set of prefix trees 10 plus this sum generation stage for implementing Step 4. The logic depth of an n-bit adder of the type illustrated in FIG. 1 is $3+\lceil \log_2 n \rceil$. If there is no carry input, then the last stage of the set of prefix trees shown in FIG. 1 is not needed.

Figure 2:
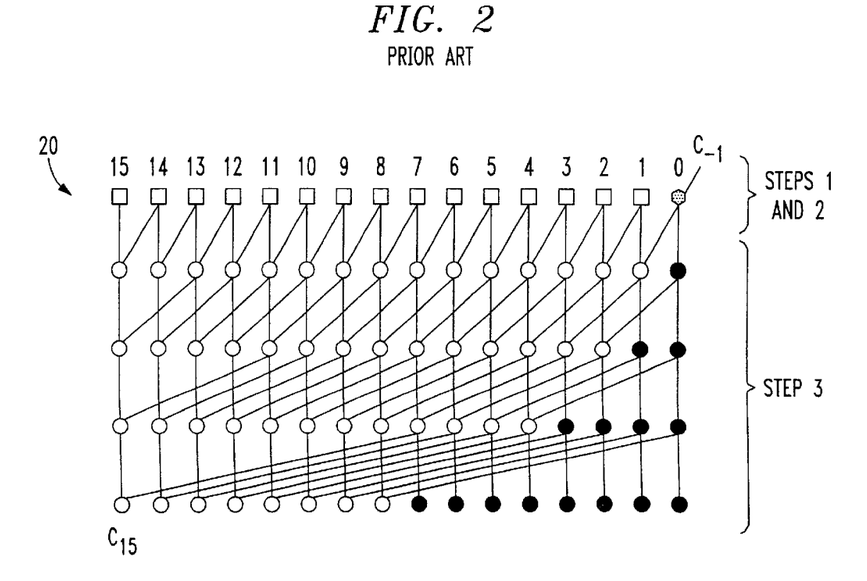

FIG. 2 illustrates an alternative set of superimposed prefix trees 20, also for the case n=16. Again, it should be noted that a complete adder of this type would include the set of prefix trees as well as a sum generation stage. In the set of prefix trees 20, the contribution due to the carry input is incorporated by redefining the first generate in the set of prefix trees as $$g_0 = a_0 b_0 + (a_0 + b_0) c_{-1} \qquad (2)$$

Such a technique is described in the above-cited Dozza et al. reference. With this change, $$G_0^j = c_j \forall j.$$

The polygon in FIG. 2 implements equation (2). This replaces the hardware required to implement Step 3 above and reduces the fanout on the $c_{-1}$ input from n to 1. However, the logic depth remains $3+\lceil \log_2 n \rceil$ and the overall delay of the adder is unchanged.

An additional speedup in the sets of superimposed prefix trees of FIGS. 1 and 2 can be achieved by using transmit signals $t_j$ instead of propagate signals $p_j$ to compute carries for each bit position. The final sum computation still requires the propagate signals $p_j$ to be generated from the primary inputs. The addition operation in this case is defined as $$\left. \begin{array}{l} g_j = a_j b_j \\ t_j = a_j + b_j \\ c_j = g_j + t_j c_{j-1} \\ s_j = (a_j \oplus b_j) \oplus c_{j-1} \end{array} \right\} \forall j, 0 \leq j < n,$$

where $(G_j^j, T_j^j) = (g_j, t_j)$, and $$(G_i^j, T_i^j) = (g_j, t_j) o (g_{j-1}, t_{j-1}) o \ldots o (g_i, t_i) \text{ if } j > i,$$

where o is the fundamental carry operator. The computation of $(G_0^j, T_0^j) \forall j$ follows the same methodology as in Step 2 above for $(G_0^j, P_0^j)$. The carry $c_j$ for each bit position is then given by $$c_j = G_0^j + T_0^j c_{-1}$$

where $c_{-1}$ is the primary carry input. If there is no primary carry input, then $c_j$ is simply $G_0^j$. The $t_j$ signals can be computed faster than the $p_j$ signals since an OR gate is typically faster than an XOR gate. Hence, the carry computation through the prefix trees can start slightly earlier if the transmit signals are used. Since the sum generation step still uses the propagate signals, the load on the transmit signals in this architecture is smaller than the load on the propagate signals in the FIGS. 1 and 2 architectures. However, the load on the input signals is now higher since both transmit and propagate signals need to be generated. For example, in the set of prefix trees 10 of FIG. 1, the open squares at the top would now need to compute the transmit signals in addition to the generate and propagate signals. The remaining circles will then operate on the transmit signals instead of the propagate signals.

Although the above-described conventional prefix tree adders can provide acceptable performance in certain applications, further improvements are needed, particularly in terms of parameters such as logic depth, delay and circuit area.

SUMMARY OF THE INVENTION

The invention provides a prefix tree adder in which the contribution due to a primary carry input is incorporated into each of at least a subset of prefix trees without introducing any significant additional overall delay. In an illustrative embodiment, the adder includes a set of prefix trees, with a given one of the prefix trees corresponding to each bit position. An n-bit prefix tree adder therefore includes n prefix trees, each associated with a bit position of the adder and including a number of computation stages. The prefix trees are interconnected such that carry signals are computed at least partially in parallel. For example, a carry signal computed in an initial stage of a given prefix tree is used in subsequent stages of the given prefix tree without introducing substantial additional delay in computation of other carry signals in other prefix trees associated with higher bit positions. Carries computed for lower bit positions are thus used to compute carries for higher bit positions, but generate, propagate and/or transmit signals may be generated in an initial stage of each of the prefix trees without utilizing a primary carry input signal in the computation.

The adder architecture of the present invention provides a reduced logic depth, delay and circuit area relative to conventional architectures. The techniques of the invention are applicable to a wide variety of prefix tree adders, including both radix-2 adders and non-radix-2 adders. These and other features and advantages of the present invention will become more apparent from the accompanying drawings and the following detailed description.

DETAILED DESCRIPTION OF THE INVENTION

The present invention will be illustrated below in conjunction with exemplary prefix tree adders. It should be understood, however, that the invention is not limited to use with any particular type of adder, but is instead more generally applicable to any carry-lookahead adder in which it is desirable to provide a significant reduction in critical path delay without unduly increasing the cost or complexity of the adder circuit. For example, although illustrated using radix-2 carry-lookahead prefix tree adders, it will be apparent to those skilled in the art that the disclosed techniques are readily applicable to other types of adders, including non-radix-2 adders.

In accordance with the invention, a primary carry input signal can be incorporated into a set of prefix trees of a prefix tree adder without introducing additional delay. In the illustrative embodiments to be described below, the carries in the prefix tree adder are computed by using a separate prefix tree for each bit position. The adder architecture of the present invention reduces the logic depth, delay and circuit area of an n-bit adder, compared to existing architectures such as those illustrated in FIGS. 1 and 2. For example, it will be shown below that a fully-static 32-bit radix-2 prefix tree adder configured in accordance with the invention has a delay on the order of 1.0 nsec in a 0.25 μm static CMOS implementation.

Figure 3:
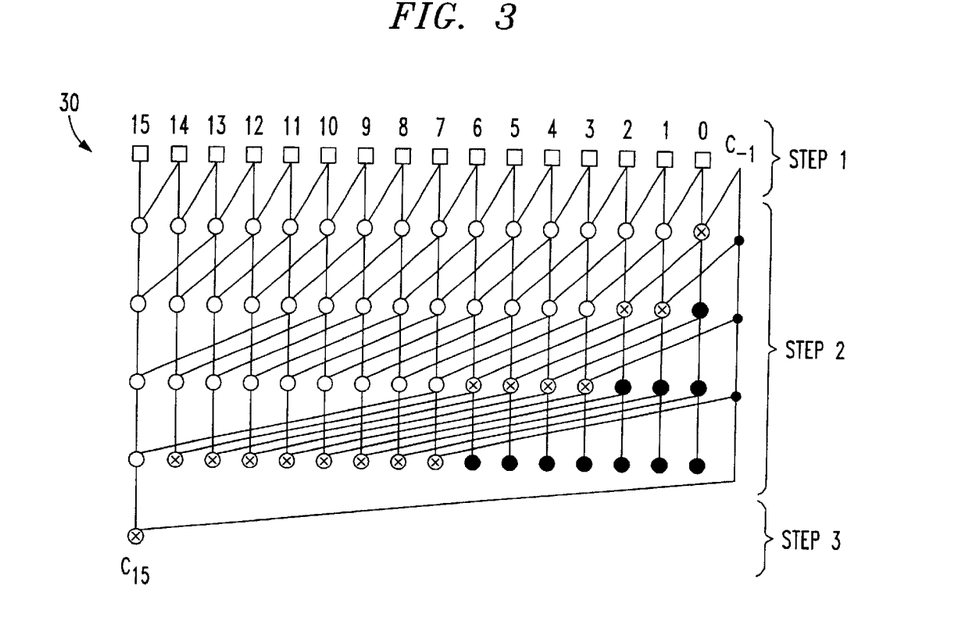
FIG. 3 shows a set of prefix trees for a prefix tree adder with carry incorporated into the trees, in accordance with a first illustrative embodiment of the present invention.

FIG. 3 shows a set of superimposed prefix trees 30 for a 16-bit prefix tree adder in accordance with a first illustrative embodiment of the invention. In the above-described conventional set of prefix trees 20 of FIG. 2, redefining the first generate in accordance with equation (2) affects the delay at every bit position. The set of prefix trees 30 overcomes this limitation of the prior art by: (i) allowing the first generate signal and propagate and/or transmit signals to be used unchanged in the first stage of each of the prefix trees, and (ii) computing the carries in parallel. For example, the carry $c_0$ computed by the prefix tree associated with the first bit position can then be used in subsequent stages of the prefix tree without affecting the delay of the carry computations for the higher bit positions. The general algorithm for an n-bit radix-2 prefix tree adder of this type is described below.

Step 1 (1 stage):
Calculate $g_j = a_j b_j$ and $p_j = a_j \oplus b_j \forall j \ 0 \leq j < n$.
Step 2 ($\lceil \log_2 n \rceil$ stages):
For $k = 1 \ldots \lceil \log_2 n \rceil$ calculate $$c_j = G_{j-2^{k-1}+1}^{j} + P_{j-2^{k-1}+1}^{j} c_{j-2^{k-1}} \forall j \ 2^{k-1}-1 \leq j < 2^k - 1 \quad (3)$$

$$(G_{j-2^k+1}^{j}, P_{j-2^k+1}^{j}) = (G_{j-2^{k-1}+1}^{j}, P_{j-2^{k-1}+1}^{j}) o (G_{j-2^k+1}^{j-2^{k-1}}, P_{j-2^k+1}^{j-2^{k-1}}) \forall j \ 2^k - 1 \leq j < n. \quad (4)$$

Step 3 (1 stage)
Calculate $$s_j = p_j \oplus c_{j-1} \forall j \ 0 \leq j < n \quad (5)$$

and $$c_{n-1} = G_0^{n-1} + P_0^{n-1} c_{-1}. \quad (6)$$

Figure 4:
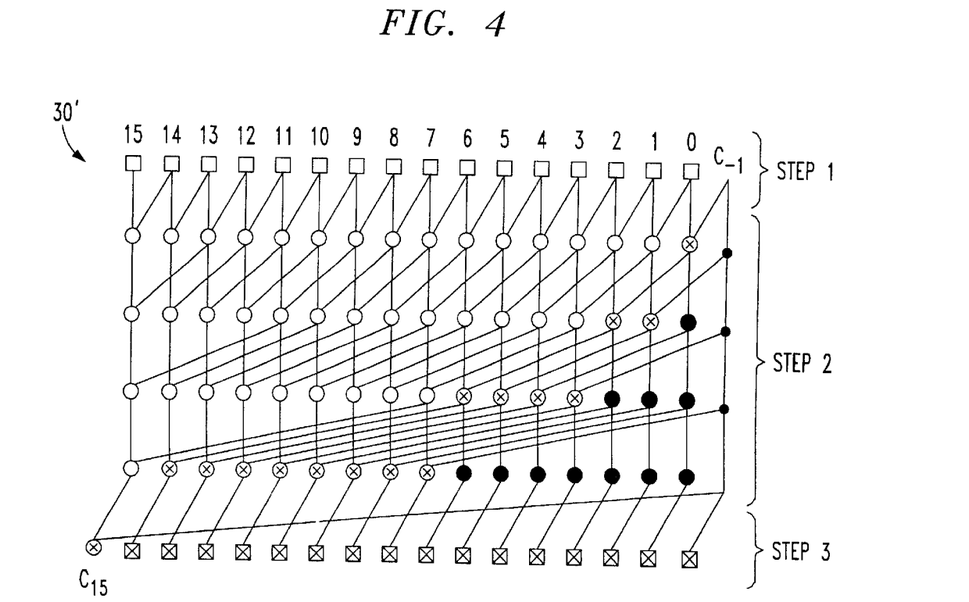
FIG. 4 illustrates a complete prefix tree adder including a set of prefix trees of the type shown in FIG. 3 and a sum generation stage.

In the set of prefix trees of FIG. 3, the open squares at the top compute $p_j$ and $g_j$ for each bit position in accordance with Step 1. The crossed circles implement equation (3) in Step 2 and equation (6) in Step 3 above. The empty circles apply the fundamental carry operator in accordance with equation (4) in Step 2, and the filled circles are buffers. A complete prefix tree adder will generally include an additional stage (not shown in FIG. 3) to generate the sum at each bit position from the $p_j$ signal and the carry from the previous bit position in accordance with equations (5) and (6), respectively, of Step 3. The sum computation of equation (5) occurs in parallel with the computation of the final carry output $c_{n-1}$. FIG. 4 shows a complete prefix tree adder 30' which includes the set of superimposed prefix trees 30 of FIG. 3 as well as the additional stage for generating the sum at each bit position.

The logic depth of an n-bit prefix tree adder configured as shown in FIG. 3 is $2 + \lceil \log_2 n \rceil$, and the fanout of the carry input $c_{-1}$ is $1 + \lceil \log_2 n \rceil$. By way of comparison, a conventional n-bit prefix tree adder configured as shown in FIG. 1 has a logic depth of $3 + \lceil \log_2 n \rceil$, and the fanout of its carry input $c_{-1}$ is n. It should be noted that the above-described algorithm can also be extended in a straightforward manner to higher radix prefix trees.

Figure 5:
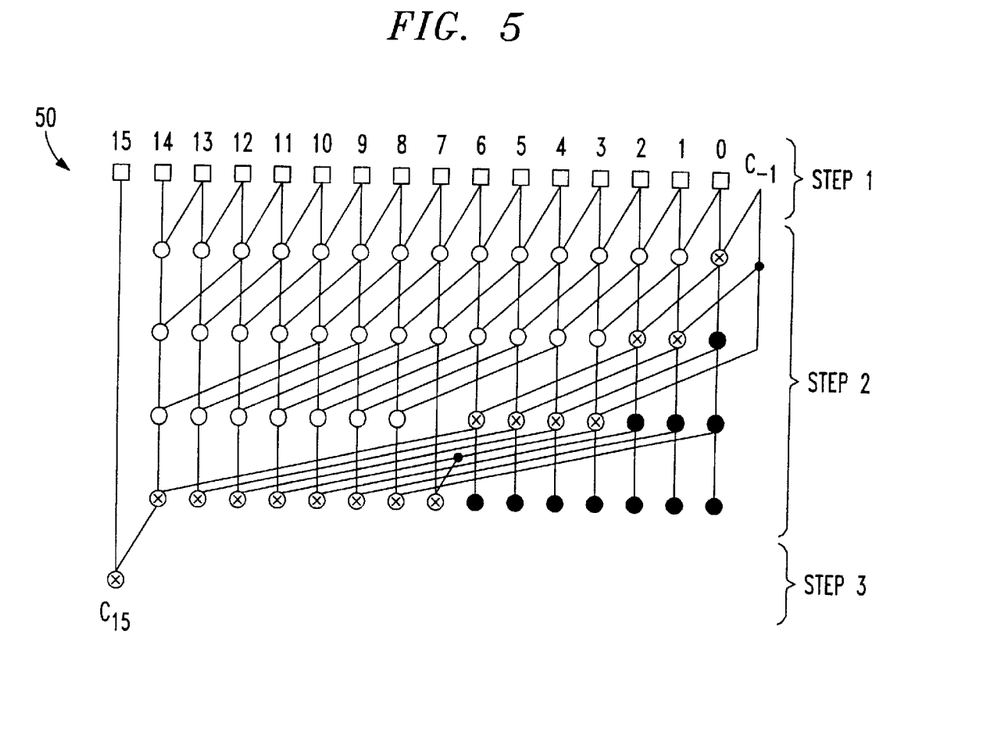
FIG. 5 shows a set of prefix trees for a prefix tree adder with carry incorporated into the trees, in accordance with a second illustrative embodiment of the present invention.

As will be described in greater detail below in conjunction with FIG. 5, $c_{n-1}$ in Step 3 above can also be calculated as, for example, $c_{n-1} = g_{n-1} + p_{n-1} c_{n-2}$. This does not affect the overall delay of the adder, but reduces area by eliminating the need to compute $G_0^{n-1}$ and $P_0^{n-1}$ in the prefix tree.

An alternative embodiment of the invention uses the transmit signals $t_j$ instead of the propagate signals $p_j$. The corresponding algorithm for a radix-2 prefix tree adder is described below.

Step 1 (1 stage):
Calculate $g_j = a_j b_j$, $t_j = a_j + b_j$, and $p_j = a_j \oplus b_j \forall j \ 0 \leq j < n$.
Step 2 ($\lceil \log_2 n \rceil$ stages):
For $k = 1 \ldots \lceil \log_2 n \rceil$ calculate $$c_j = G_{j-2^{k-1}+1}^{j} + T_{j-2^{k-1}+1}^{j} c_{j-2^{k-1}} \forall j \ 2^{k-1}-1 \leq j < 2^k - 1$$

$$(G_{j-2^k+1}^{j}, T_{j-2^k+1}^{j}) = (G_{j-2^{k-1}+1}^{j}, T_{j-2^{k-1}+1}^{j}) o (G_{j-2^k+1}^{j-2^{k-1}}, T_{j-2^k+1}^{j-2^{k-1}}) \forall j \ 2^k - 1 \leq j < n.$$

Step 3 (1 stage)
Calculate $$s_j = p_j \oplus c_{j-1} \forall j \ 0 \leq j < n,$$

and $$c_{n-1} = G_0^{n-1} + T_0^{n-1} c_{-1}.$$

In implementing the above algorithm using the set of prefix trees 30 of FIG. 3, the open squares at the top now need to compute the transmit signal in addition to the generate and propagate signals. The remaining circles operate on the transmit signals instead of the propagate signals.

In the adder architecture of FIG. 3, the previous stage carries, i.e., lower bit position carries, are used to produce the high order carries. The interconnect lines to the last stage of the carry generation need to run over a distance of n/2 bits. Also, to generate the block carry out $c_{n-1}$, the block carry in $c_{-1}$ needs to run from bit position 0 to bit position n. The block carry out $c_{n-1}$ in the FIG. 3 architecture with n=16 is computed as follows $$c_{n-1} = G_0^{15} + T_0^{15} c_{-1},$$

and therefore requires an extra column of carry operators for calculating $(G_0^n, T_0^n)$. FIG. 5 shows an alternative set of superimposed prefix trees 50 in accordance with the invention for the n=16 embodiment. The set of prefix trees 50 implements the following computation $$c_{15} = G_{15} + T_{15} c_{14},$$

thereby eliminating a number of long interconnection wires. This compensates for the increased capacitive load on $c_{14}$.

The same approach can be applied to an intermediate carry out, i.e., carry out $C_7$. In the FIG. 3 implementation, this carry out is generated by $(G_0^7, T_0^7)$ and $c_{-1}$ as $$c_7 = G_0^7 + T_0^7 c_{-1}.$$

Eliminating the cell which generates $(G_0^7, T_0^7)$ and using $(G_4^7, T_4^7)$ and $c_3$ to generate $c_7$ as $$c_7 = G_4^7 + T_4^7 c_3$$

reduces the number total gates needed to implement the adder architecture. Since the fanout of the cell which generates ($G_3^7$, $T_3^7$) is reduced from 2 to 1, and the fanout of $c_3$ is increased from 1 to 2, this approach balances the overall delay for $c_3$ generation.

The implementations described above in conjunction with FIG. 5 can be generalized for an n-bit prefix tree adder with carry input incorporated into the tree. The block carry out in this case would be generated as $$c_{n-1} = G_{n-1}^{n-1} + T_{n-1}^{n-1} c_{n-2}.$$

The first (from the right) intermediate carry for every carry generation starting with $c_7$ would be generated as follows $$c_{j-1} = G_{j/2}^{j-1} + T_{j/2}^{j-1} c_{j/2-1},$$

where j=8, 16, 32, 64, etc.

For purposes of illustrating the advantages of the invention, 32-bit versions of the prefix tree adder architectures shown in FIGS. 1 and 3 were implemented using a 0.25 μm CMOS process, with fully static circuits. The layout area of the 32-bit adder using the conventional FIG. 1 architecture was approximately 350 μm×115 μm (~0.04 mm²), while the layout area of the 32-bit adder using the FIG. 3 architecture of the present invention was significantly smaller, i.e., 350 μm×80 μm (~0.03 mm²). The delay of the 32-bit adder using the conventional FIG. 1 architecture was determined to be on the order of 1.1 ns, while the delay of the 32-bit adder using the FIG. 3 architecture was determined to be approximately 10% less, i.e., 1.0 ns. The power consumption of the 32-bit adders for the FIG. 1 and FIG. 3 architectures was approximately the same, on the order of 32 mW at 400 MHZ and a Vdd supply voltage of 2.5 volts.

Although static circuits were used in the above-described 32-bit implementations, it should be noted that the invention may be implemented using either static circuits, dynamic circuits or combinations of both static and dynamic circuits. Static circuits are often preferred to dynamic circuits because of their ease of design. In addition, static circuits generally consume less area and power because they do not need clocks to precharge internal nodes.

FIGS. 6 through 9 illustrate a number of circuits, each of which incorporate one or more prefix tree adders in accordance with the invention. In each of these example circuits, the vertical arrows indicate the bit flow between the various circuit elements.

Figure 6:
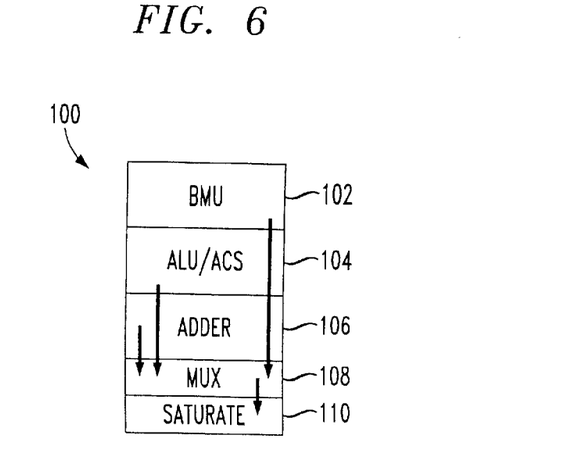
FIGS. 6 through 9 show examples of circuits which incorporate a prefix tree adder in accordance with the invention.
Figure 7:
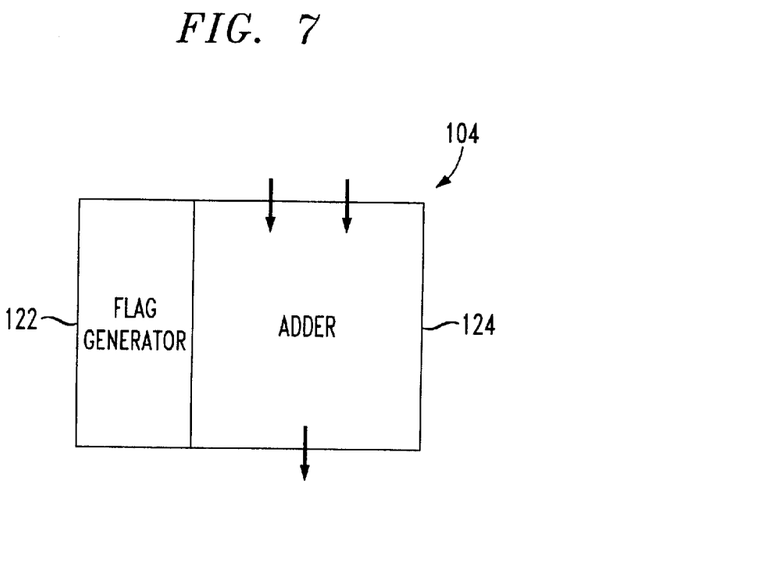
Figure 8:
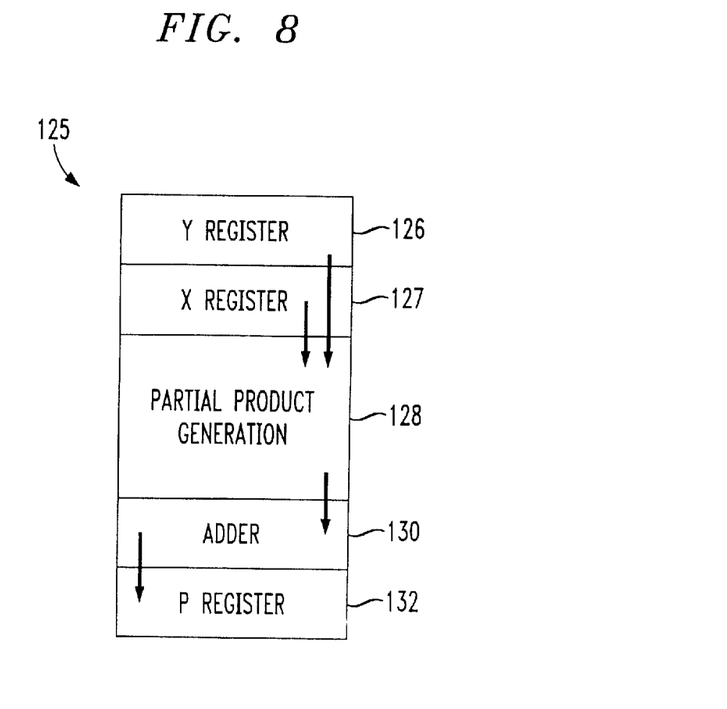
Figure 9:
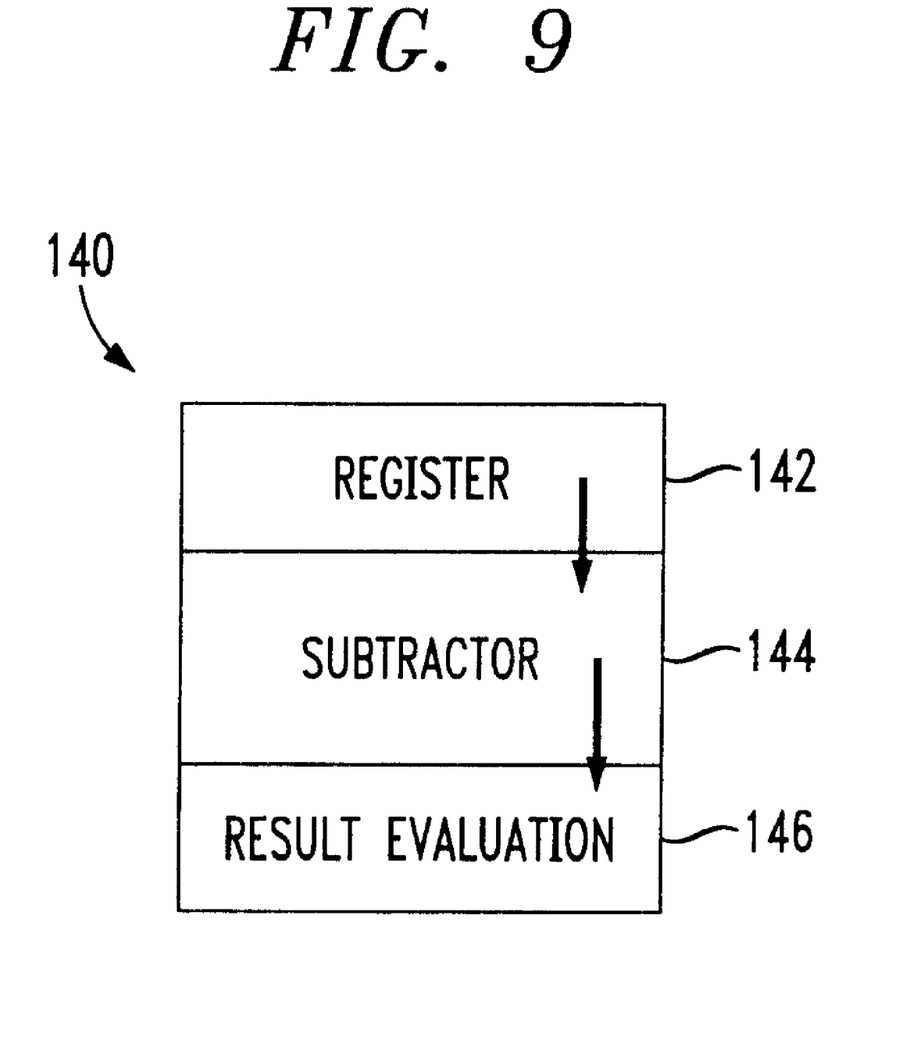

FIG. 6 shows an exemplary embodiment of a data arithmetic unit (DAU) 100 which includes a bit manipulation unit (BMU) 102, an arithmetic logic unit (ALU)/add-compare-subtract (ACS) 104, an adder 106, a multiplexer 108 and saturate logic 110. Prefix tree adders in accordance with the invention may be used for the adder 106 and/or incorporated into the ALU/ACS 104. FIG. 7 shows the ALU/ACS 104 of FIG. 6 in greater detail. The ALU/ACS 104 includes a flag generator 122 and a prefix tree adder 124. FIG. 8 shows an exemplary multiply-add unit 125 which includes a Y register 126, an X register 127, a partial product generation element 128, an adder 130 and a P register 132. FIG. 9 shows a comparator 140 which includes a register 142, a subtractor 144 and a result evaluation element 146. The adder 130 of FIG. 8 and the subtractor 144 of FIG. 9 are implemented as one or more prefix tree adders in accordance with the invention. It should be emphasized that FIGS. 6 through 9 are illustrative only, and therefore should not be construed as limiting the invention to use in certain types of circuits.

The above-described illustrative embodiments of the invention may be configured to meet the requirements of a variety of different circuit applications, using any desired value of n. As noted above, adders in accordance with the invention may be used to implement circuits such as, e.g., ALUs, multiply-add units, and comparators. The invention can be incorporated in integrated circuits used in numerous applications, including microprocessors, memory circuits and telecommunications hardware. Moreover, as previously noted, a variety of other types of adders, including non-radix-2 adders, may also make use of the techniques of the present invention. These and numerous other alternative embodiments may be devised by those skilled in the art without departing from the scope of the following claims.

What is claimed is:

1. An adder circuit comprising:
a plurality of prefix trees, each associated with a bit position of the adder and including one or more computation stages, wherein the prefix trees are interconnected such that carry signals are computed at least partially in parallel, and wherein a block carry out signal associated with a final bit position of the adder is generated at least in part as a function of a carry signal computed in one of the prefix trees associated with an immediately preceding bit position of the adder.

2. The adder of claim 1 wherein the adder is a radix-2 adder.

3. The adder of claim 1 further including a separate prefix tree for each bit position.

4. The adder of claim 1 wherein a carry computed for a lower bit position is used to compute a carry for at least one higher bit position in parallel within the corresponding prefix trees.

5. The adder of claim 1 wherein a generate signal and at least one of a propagate signal and a transmit signal are generated in an initial stage of each of the prefix trees without utilizing a primary carry input signal.

6. The adder of claim 1 wherein an initial stage of each of the prefix trees calculates a generate signal $g_j = a_j b_j \forall j\ 0 \leq j < n$, and a propagate signal $p_j = a_j \oplus b_j \forall j\ 0 \leq j < n$, where n is the number of bit positions of the adder.

7. The adder of claim 6 wherein a plurality of subsequent stages of each of the prefix trees each calculate $$c_j = G_{j-2^{k-1}+1}^j + P_{j-2^{k-1}+1}^j c_{j-2^{k-1}} \forall j\ 2^{k-1}-1 \leq j - 2^k - 1$$

$$(G_{j-2^k+1}^j, P_{j-2^k+1}^j) = (G_{j-2^{k-1}+1}^j, P_{j-2^{k-1}+1}^j) o (G_{j-2^k+1}^{j-2^{k-1}}, P_{j-2^k+1}^{j-2^{k-1}}) \forall j\ 2^k-1 \leq j < n.$$

where $$(G_i^j, P_i^j) = (g_j, p_j) o (g_{j-1}, p_{j-1}) o \ldots o (g_i, p_i) \text{ if } j > i,$$

and o is a carry operator.

8. The adder of claim 7 wherein at least one additional stage of each of the prefix trees calculates $$s_j = p_j \oplus c_{j-1} \forall j\ 0 \leq j < n$$

and $$c_{n-1} = G_0^{n-1} + P_0^{n-1} c_{-1}.$$

9. The adder of claim 1 wherein an initial stage of each of the prefix trees calculates a generate signal $g_j = a_j b_j \forall j\ 0 \leq j < n$, a transmit signal $t_j = a_j + b_j \oplus j\ 0 \leq j < n$, and a propagate signal $p_j = a_j \forall j\ 0 \leq j < n$, where n is the number of bit positions of the adder.

10. The adder of claim 9 wherein a plurality of subsequent stages of each of the prefix trees each calculate $$c_j = G_{j-2^{k-1}-1}{}^j + T_{j-2^{k-1}+1}{}^j c_{j-2^{k-1}} \forall j\ 2^{k-1}-1 \leq j < 2^k-1$$

$$(G_{j-2^k+1}{}^j, T_{j-2^k+1}{}^j) = (G_{j-2^{k-1}+1}{}^j, T_{j-2^{k-1}+1}{}^j) o (G_{j-2^k+1}{}^{j-2^{k-1}}, T_{j-2^k+1}{}^{j-2^{k-1}}) \forall j\ 2^k-1 \leq j < n.$$

where $$(G_i{}^j, T_i{}^j) = (g_j, t_j) o (g_{j-1}, t_{j-1}) o \ldots o (g_i, t_i) \text{ if } j > i,$$

and o is a carry operator.

11. The adder of claim 10 wherein at least one additional stage of each of the prefix trees calculates $$s_j = p_j \oplus c_{j-1} \forall j\ 0 \leq j < n$$

and $$c_{n-1} = G_0{}^{n-1} + T_0{}^{n-1} c_{-1}.$$

12. The adder of claim 9 wherein the block carry out signal is generated as $$c_{n-1} = G_{n-1}{}^{n-1} + T_{n-1}{}^{n-1} c_{n-1}.$$

13. The adder of claim 10 wherein a first intermediate carry for every bit position starting with bit position j/2 is generated as $$c_{j-1} = G_{j/2}{}^{j-1} + T_{j/2}{}^{j-1} c_{j/2-1},$$

where j is at least one of 8, 16, 32 and 64.

14. An integrated circuit comprising:
at least one prefix tree adder, the adder including a plurality of prefix trees, each of the prefix trees associated with a bit position of the adder and including one or more computation stages, wherein the prefix trees are interconnected such that carry signals are computed at least partially in parallel, and wherein a block carry out signal associated with a final bit position of the adder is generated at least in part as a function of a carry signal computed in one of the prefix trees associated with an immediately preceding bit position of the adder; and
at least one additional circuit element coupled to the prefix tree adder and having at least one of an input for receiving a signal from the prefix tree adder and an output for delivering a signal to the prefix tree adder.

15. The integrated circuit of claim 14 wherein the prefix tree adder is a radix-2 adder.

16. The integrated circuit of claim 14 wherein the prefix tree adder further includes a separate prefix tree for each bit position.

17. The integrated circuit of claim 14 wherein a carry computed for a lower bit position is used to compute a carry for at least one higher bit position in parallel within the corresponding prefix trees.

18. The integrated circuit of claim 14 wherein a generate signal and at least one of a propagate signal and a transmit signal are generated in an initial stage of each of the prefix trees without utilizing a primary carry input signal.

19. The integrated circuit of claim 14 wherein an initial stage of each of the prefix trees calculates a generate signal $g_j = a_j b_j \forall j\ 0 \leq i < n$, and a propagate signal $p_j = a_j \oplus b_j \forall j\ 0 \leq j < n$, where n is the number of bit positions of the adder.

20. The integrated circuit of claim 14 wherein an initial stage of each of the prefix trees calculates a generate signal $g_j = a_j b_j \forall j\ 0 \leq j < n$, a transmit signal $t_j = a_j + b_j \forall j\ 0 \leq j < n$, and a propagate signal $p_j = a_j \oplus b_j \forall j\ 0 \leq j < n$, where n is the number of bit positions of the adder.

21. A method for performing an addition operation, the method comprising the steps of:
providing a plurality of prefix trees in a prefix tree adder, each prefix tree associated with a bit position of the adder and including one or more computation stages; and
computing carry signals at least partially in parallel in the prefix trees, such that a block carry out signal associated with a final bit position of the adder is generated at least in part as a function of a carry signal computed in one of the prefix trees associated with an immediately preceding bit position of the adder.

22. The method of claim 21 wherein a carry computed for a lower bit position is used to compute a carry for at least one higher bit position in parallel within the corresponding prefix trees.

23. The method of claim 21 wherein a generate signal and at least one of a propagate signal and a transmit signal are generated in an initial stage of each of the prefix trees without utilizing a primary carry input signal.

24. The method of claim 21 wherein an initial stage of each of the prefix trees calculates a generate signal $g_j = a_j b_j \forall j\ 0 \leq j < n$, and a propagate signal $p_j = a_j \oplus b_j \forall j\ 0 \leq j < n$, where n is the number of bit positions of the adder.

25. The method of claim 21 wherein an initial stage of each of the prefix trees calculates a generate signal $g_j = a_j b_j \forall j\ 0 \leq j < n$, a transmit signal $t_j = a_j + b_j \forall j\ 0 \leq j < n$, and a propagate signal $p_j = a_j \oplus b_j \forall j\ 0 \leq j < n$, where n is the number of bit positions of the adder.

\* \* \* \* \*